United States Patent
Eisenhawer et al.

(10) Patent No.: US 11,954,176 B1
(45) Date of Patent: Apr. 9, 2024

(54) GENERATION OF VIRTUAL TRAINING SETS FOR NEURAL NET APPLICATIONS

(71) Applicant: Periculum Labs Inc., Ottawa (CA)

(72) Inventors: Stephen W. Eisenhawer, Santa Fe, NM (US); Terry F. Bott, Los Alamos, NM (US)

(73) Assignee: Periculum Labs Inc., Ottawa (CA)

( * ) Notice: Subject to any disclaimer, the term of this patent is extended or adjusted under 35 U.S.C. 154(b) by 0 days.

(21) Appl. No.: 18/308,503

(22) Filed: Apr. 27, 2023

Related U.S. Application Data

(63) Continuation of application No. 16/705,008, filed on Dec. 5, 2019, now Pat. No. 11,669,589.
(Continued)

(51) Int. Cl.
G06N 5/04 (2023.01)
G06F 18/214 (2023.01)
(Continued)

(52) U.S. Cl.
CPC ......... *G06F 18/2148* (2023.01); *G06N 3/084* (2013.01); *G06N 5/04* (2013.01); *G06N 7/01* (2023.01)

(58) Field of Classification Search
CPC ........ G06K 9/6257; G06N 3/084; G06N 5/04; G06N 7/005
See application file for complete search history.

(56) References Cited

U.S. PATENT DOCUMENTS

2012/0271612 A1   10/2012   Barsoum et al.

OTHER PUBLICATIONS

"Big challenge in Deep Learning: training data", https://hackernoon.com/%EF%B8%8F-big-challenge-in-deep-learning-training-data-31a88b97b282, 2017, 1-6.
(Continued)

*Primary Examiner* — Sam Bhattacharya
(74) *Attorney, Agent, or Firm* — Peacock Law P.C.; Janeen Vilven

(57) ABSTRACT

One embodiment of the present invention provides a computer implemented method for generating a training set to train a convolutional neural network comprising the steps of providing prediction space data to a General Logic Gate Module (GLGM). Prediction space expert judgement is also provided to the GLGM and to a sensitivity and importance module. The GLGM determines or outputs state possibilities. The state possibilities are provided to the sensitivity and importance module and to the feature extraction module. Feature extraction algorithms are applied to the state possibilities within the feature extraction module to produce a training possibility set that is a virtual training possibility set. The training possibility set is provided to a state inferential module and to a final training set. From the state inferential module a possibility ranking is generated that is independent of the convolutional neural network and further the output from the state inferential module is provided to a sensitivity and importance module for analysis. A sensitivity parameter and an importance parameter is determined from the output from the sensitivity and importance module. The state possibility ranking is provided to the final training set. The sensitivity parameter and importance parameter are provided to a final training set and a training set structure metric. A convolutional neural network input layer is generated from the final training set informed by one or more of the state possibility ranking, the sensitivity parameter, the importance parameter and the training possibility set. A convolutional neural network layer design is generated from the training set structure metric.

16 Claims, 11 Drawing Sheets

Related U.S. Application Data

(60) Provisional application No. 62/775,641, filed on Dec. 5, 2018.

(51) Int. Cl.
  *G06N 3/084* (2023.01)
  *G06N 7/01* (2023.01)

(56) References Cited

OTHER PUBLICATIONS

Bott, Terry F., et al., "A Logic Model Approach To the Conceptual Design of a Scientific/Industrial Complex", ASME-PVP Annual Meeting, Vancouver, 2002, PVP-444, 2002, 119-127.

Eisenhawer, S. W., et al., "An Approximate Reasoning-Based Method for Screening High-Level-Waste Tanks for Flammable Gas", Nuclear Technology, vol. 130, 2000, 351-361.

Eisenhawer, Steve, et al., "Assessing the Risk of Nuclear Terrorism Using Logic Evolved Decision Analysis", American Nuclear Society Annual Meeting, San Diego, CA, 2003, 1-9.

Eisenhawer, Stephen, et al., "Counter UAS: Risk Screening for a Refinery", Unmanned Systems Canada Annual Conference, Toronto, 2017, 1-20.

Eisenhawer, S. W., "Risk-Based Prioritization of Research for Aviation Security Using Logic-Evolved Decision Analysis", International System Safety Conference, Providence, Rhode Island, 2004, 1-10.

Nott, George, "'Explainable Artificial Intelligence': Cracking open the black box of AI", https://www.computerworld.com.au/article/617359/explainable-artificial-intelligence-cracking-open-black-box-ai/, 2017, 1-2.

GENERATION OF VIRTUAL TRAINING SETS FOR NEURAL NET APPLICATIONS

CROSS-REFERENCE TO RELATED APPLICATIONS

This application is a Continuation application of U.S. patent application Ser. No. 16/705,008, entitled "Generation of Virtual Training Sets for Neural Net Applications", filed Dec. 5, 2019 which claims priority to and the benefit of the filing of U.S. Provisional Patent Application No. 62/775,641, entitled "Deep Neural Networks and Artificial Intelligence Applications", filed on Dec. 5, 2018, and the specification and claims thereof are incorporated herein by reference.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Advances in computer science coupled with significant increases in computational power have made possible major advances in the application of Artificial Intelligence (AI) to real world problems. Of particular importance has been the introduction of a type of Artificial Neural Networks (ANN) referred to as Deep Neural Nets (DNN) for a variety of pattern recognition problems. Successes in these areas have encouraged a number of AI startups to target other recognition and decision problems as opportunities for DNNs. As the number of potential applications has grown, it has become clear that there are also challenges in building neural net applications that will slow their introduction into the economy. A significant challenge is the time needed to develop a new application. A popular misconception is that the major portion of this time is taken up with the design and construction of the network itself. An article by DNN developers at Deep Systems (deepsystems.ai) found at the world wide web in Medium (medium.ai) describes the real situation succinctly.

"Lots of people have jumped on AI hype train and created awesome tools to build and train neural networks, but very few focus on training data. When companies try to apply AI they have all the tools to train neural networks but lack the tools to develop training sets." The accuracy of a convolutional deep neural network "NN" depends on the quality and quantity of the training sets used in its development. If the available training sets are small, then performance will be adversely affected. Within the portion of the problem space covered by the training set, low accuracy can be described as errors in interpolation. It is prudent to assume that operational data may cover a large portion of the problem space. In this case the NN will be operating at least partially in an extrapolation mode and it will be difficult to predict the output accuracy. The importance of performance in the extrapolation mode will depend upon how frequently it occurs and the consequences of error.

In the event of no training data it will be impractical to even consider development of a NN and while publicly available training sets do exist, they are limited in scope and serve primarily as benchmarks for methods development. Training set data for commercial applications is almost always proprietary. When these data are unavailable then they will be expensive to acquire. The net effect is that large corporations who either already have the data or can acquire it will have access to higher performing AI solutions as shown in FIG. 1.

A second issue associated with the use of NNs is referred to as explainability and has received greater attention in recent years. Explainability deals with answering the question: For a given set of inputs why did the neural net output the observed value? This question can be re-worded as: Is the output traceable, consistent and defensible? When the application is in interpolation mode and a sufficiently large and well-structured training set was used during development then consistency is rarely an issue. Defensibility is normally addressed by first evaluating the application during a test phase. The input data used in this phase are typically elements of the training set withheld during the training/backpropagation process. Additional evaluation usually occurs after the NN goes into operation. However, it is difficult to quantify the actual accuracy especially if the application is in extrapolation mode. Problems with satisfying consistency and defensibility metrics arise primarily from issues associated with traceability. Lack of traceability occurs because a NN functions basically as a "black box" that transforms the inputs to an output. Tools exist to evaluate the propagation of signals through the network however this is (unsurprisingly) analogous to neurology in biological systems and answers cast in the form of logic or problem-solving methods are only possible for relatively simple networks. This results in the paradoxical situation where performance is driven by large training sets and high granularity networks at the expense of understanding. An increase in performance will be accompanied by a decrease in traceability and therefore a decrease in explainability as shown in FIG. 2.

One embodiment of the present invention provides for the use of a system and method to develop improved NN's. This system and method will also apply to convolutional neural networks that are sparse or shallow. One aspect provides an effective tool to generate better training sets and a unique approach to addressing the explainability problem of convolutional neural networks.

BRIEF SUMMARY OF THE INVENTION

One embodiment of the present invention provides a computer implemented method for generating a training set to train a convolutional neural network comprising the steps of providing prediction space data to a General Logic Gate Module (GLGM). Prediction space expert judgement is also provided to the GLGM and to a sensitivity and importance module. The GLGM determines or outputs state possibilities. For example, the output of the GLGM comprise intermediate quantitative variable values that are converted to a Degree of Membership (DoM) vectors and each DoM vector is converted to a point numerical value for state possibility ranking. The state possibilities are provided to the sensitivity and importance module and to the feature extraction module. For example, the state possibilities produced during operation of the GLGM include intermediate quantitative values or qualitative values. Feature extraction algorithms are applied to the state possibilities within the feature extraction module to produce a training possibility set that is a virtual training possibility set. The training possibility set is provided to a state inferential module and to a final training set. From the state inferential module a possibility ranking is generated that is independent of the convolutional neural network and further the output from the state inferential module is provided to a sensitivity and importance module for analysis. For example, the state inferential module is configured to analyze the training possibility set using one of Bayesian Belief Network, Multi attribute Weighting, or Predicate Logic but not limited thereto. A sensitivity parameter and an importance parameter is determined from the output from the sensitivity and importance module. For example, a Monte Carlo simulation is used to determine sensitivity parameters. The state possibility ranking is provided to the final training set. The sensitivity parameter and importance parameter are provided to a final training set and a training set structure metric. A convolutional neural network input layer is generated from the final training set informed by one or more of the state possibility ranking, the sensitivity parameter, the importance parameter and the training possibility set. For example, a final values of any variables that are identified as elements of the final training set go to the convolutional neural network input layer. A convolutional neural network layer design is generated from the training set structure metric. In another embodiment, a real world training set (RTS) is provided to the GLGM to produce the state possibilities that produce training possibility sets that are hybrid training sets (HTS) comprising both virtual training possibility sets and real world training possibility sets from the state possibilities that are informed by the RTS, predication space data and/or prediction space experts. When a HTS is generated, the HTS extends the range of the convolutional neural network in a consistent and traceable way beyond that of the convolution neural network trained only with the RTS. The method of either embodiment can further comprise a backpropagation module to further train the convolutional neural network wherein the backpropagation module is linked to the method used to generate the VTS and/or the HTS. For example, the backpropagation module is configured for analysis with predicate logic. For example, the convolutional neural network trained with the VTS yields accurate predictions in an operational environment when RTS is sparse or non-existent. For example, the method of the one or more embodiments can be implemented by one or more processors executing computer program instructions that, when executed, perform the method.

Another embodiment of the present invention provides for one or more computer storage devices having computer-executable instructions stored thereon for generating training sets to train a convolutional neural network, which, on execution by a computer, cause the computer to perform operations, the instructions comprise: receiving at a General Logic Gate Module (GLGM) prediction space data and/or space expert judgement. Determining at the GLGM and/or outputting from the GLGM a state possibilities. Providing the state possibilities to a sensitivity and importance module. For example, the output of the GLGM comprises intermediate quantitative variable values that are converted to a Degree of Membership (DoM) vectors and for example, each DoM vector is converted to a point numerical value for state possibility ranking. The state possibilities are provided to the sensitivity and importance module and to the feature extraction module. For example, the state possibilities produced during operation of the GLGM include intermediate quantitative values or qualitative values. Feature extraction algorithms are applied to the state possibilities within the feature extraction module to produce a training possibility set that in this embodiment is a virtual training possibility set. The training possibility set is provided to a state inferential module and to a final training set. From the state inferential module a possibility ranking is generated that is independent of the convolutional neural network and further the output from the state inferential module is provided to a sensitivity and importance module for analysis. For example, the state inferential module is configured to analyze the training possibility set using one of Bayesian Belief Network, Multi attribute Weighting, or Predicate Logic but not limited thereto. A sensitivity parameter and an importance parameter is determined from the output from the sensitivity and importance module. For example, a Monte Carlo simulation is used to determine sensitivity parameters. The state possibility ranking is provided to the final training set. The sensitivity parameter and importance parameter are provided to a final training set and a training set structure metric. A convolutional neural network input layer is generated from the final training set informed by one or more of the state possibility ranking, the sensitivity parameter, the importance parameter and the training possibility set. For example, a final values of any variables that are identified as elements of the final training set go to the convolutional neural network input layer. A convolutional neural network layer design is generated from the training set structure metric. In another embodiment, a real world training set (RTS) is provided to the GLGM to produce the state possibilities that produce training possibility sets that are hybrid training sets (HTS) comprising both virtual training possibility sets and real world training possibility sets from the state possibilities that are informed by the RTS, predication space data and/or prediction space experts. When a HTS is generated, the HTS extends the range of the convolutional neural network in a consistent and traceable way beyond that of the convolution neural network trained only with the RTS. The method of either embodiment can further comprise a backpropagation module to further train the convolutional neural network wherein the backpropagation module is linked to the method used to generate the VTS and/or the HTS. For example, the backpropagation module is configured for analysis with predicate logic. For example, the convolutional neural network trained with the VTS yields accurate predictions in an operational environment when RTS is sparse or non-existent.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims (if any).

One embodiment of the system and method of the present invention provides one or more of the following aspects:

1) The aspect to build a "Virtual Training Set" (VTS) that incorporates specific features derived from human judgment and where individual members of the VTS are generated using a General Logic Gate Module (GLGM); the output of the GLGM is a set of state possibilities that when further processed by the Feature Extractor module yields the Training Possibility/VTS.

2) The aspect to combine a sparse Real World Training Set (RTS) with a consistent VTS to generate a much larger Hybrid Training Set (HTS). For example, a sparse training set is one that is insufficient for generating a convolutional neural net that provides accurate predictions with operational data. This state can occur because of one or more of the following: the total number of instances in the training set is small, the training set has too few instances to cover the range of operational input values, the input layer of the neural net requires additional elements (features) that are not in the set. (Note: here 'sparse' does not refer to the structure of the net itself.) In one example, a consistent VTS a) includes all of the elements (features) in the RTS and b) will have individual instances where the element quantitative values match an instance in the RTS. In one example, the number of instances in a HTS will contain all of the RTS instances and a much larger number of instances generated using embodiments of the methods disclosed herein.

3) The aspect to use a HTS to extend the range of a convolutional neural network beyond that of an associated RTS in a consistent and traceable way. This points back to the discussion of interpolation versus extrapolation. If the number of instances in the training set is small then it is likely that the extent of the n-dimensional space covered by the RTS is smaller, possibly much smaller than that of the operational data where accurate predictions are necessary. A VTS contains instances where one or more of the elements (features) have values that are less than the minimum value or greater than the maximum values in the RTS. A VTS is generated using a GLGM so the structure of an instance and the procedure used to generate element quantitative values are specified explicitly.

4) The aspect for better identification of key features in training sets and improved specification of data requirements for training sets. Not all of the inputs to the net—the individual elements in the instances are of equal importance or weight. We can use the Sensitivity and Importance features of the method to identify these 'key features'—the ones with the most influence. In the case where more RTS data can be obtained then Sensitivity and Importance features can be used to specify the test program to focus on the key features.

5) The aspect for more efficient backpropagation using an Approximate Reasoning (AR) model that is explicitly linked to the models used to generate a VTS or HTS. More efficient backpropagation means that the net can be trained more rapidly to a specified level of prediction accuracy. Also, in the case where a sparse net is being built the process of dropping connections can be done more rapidly as well.

6) The aspect for implicit incorporation of higher-level human reasoning into the training set.

7) The aspect for better 'explainability' of the output of an NN in both the training and operational modes with the ability to implement a watchdog or monitor function.

BRIEF DESCRIPTION OF THE SEVERAL VIEWS OF THE DRAWINGS

The accompanying drawings illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
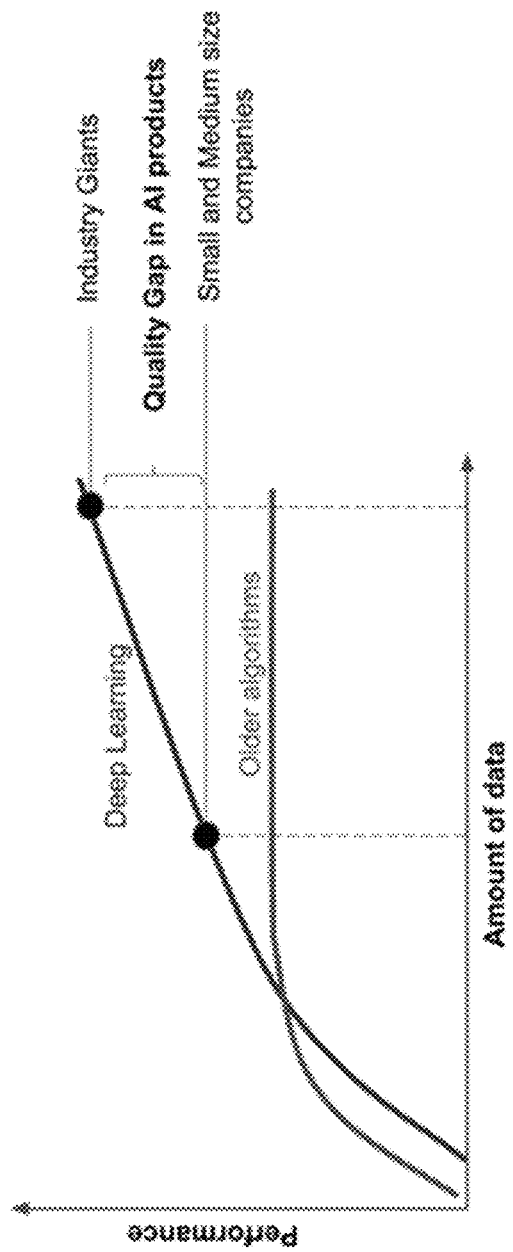
FIG. 1 illustrates a graph of the training set size and the NN performance.
Figure 2:
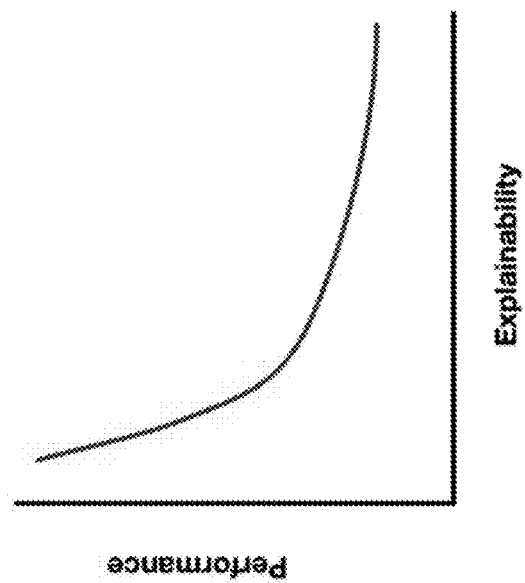
FIG. 2 illustrates a graph of performance vs explainability.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A training set $\{S\}$ is used to train a convolutional neural network. The purpose of the network is to make accurate predictions about the state of a system when operational data is the input to the NN. There are three different types of training sets Virtual, Real and Hybrid as defined below. Members of $\{S\}$ are referred to as instances I, $I_j$, $j=1, C(\{S\})$ where $C(\{S\})$ is the Cardinality or size, $L_s$ of the training set. An instance is itself a set composed of elements E. Each element is a measure of a particular feature, $F_k$ in the n-dimensional operational space O for which predictions P will be made. When the number of elements in each instance is the same then the location of a particular element is specified as $E_{jk}$, $k=1, C(I)$, where $L_I=C(I)$ is the length of each Instance. The structure of a training set is then $$\{S\}=\{\{E_{11},E_{12},\ldots E_{1L_I}\},\{E_{21},E_{22},\ldots E_{2L_I}\},\ldots \{E_{L_S1},E_{L_S2},\ldots E_{L_SL_I}\}\}$$

The elements have a one-to-one correspondence with the nodes in the input layer of the NN, $N_m$ where k=m. The number of features represented in an Instance, $L_i$ is $L_I \leq N_o$, where $N_o$ is the total number of dimensions in O. When the inequality exists then the input layer is incomplete and the NN is an approximate predictor. An element $E_{jk}$ can take on a value V in the range [min(V($E_{jk}$), max(V($E_{jk}$))]. The range for each element is a measure of the extent to which the training set is a complete sample of O in the $k^{th}$ dimension. The performance of a NN is measured in terms of a prediction accuracy function, P. If the output layer contains $N_{out}$ nodes then performance is acceptable with respect to the training set if the nodal output prediction $P_{nout}$ exceeds $P^*_{nout}$, the prediction goal for all instances in the training set.

The three types of training sets are defined as follows:
1) A Virtual Training Set (VTS), $\{S_V\}$ is generated using the method described in this invention and does not contain any instance where the elements and associated element values are obtained from real world data for the operational space.
2) A Real Training Set (RTS), $\{S_R\}$ has the same structure as a virtual one. When the data upon which $S_R$ is built is small then there will be many fewer instances in comparison to $S_V$, $L_R \ll L_V$ and the length of an instance will often be smaller as well: $L_{RI} \ll L_{VI}$. That is, the dimensionality of the training set sample of the operational space is smaller so the number of features represented is smaller as well. Further within this subspace the number of sample points (corresponding to the number of instances is smaller) compared to a virtual training set An RTS is considered sparse if one or more of the following conditions exist after the NN is trained: 1) the observed prediction accuracy based on the included instances is less than the prediction accuracy goal and 2) the number of known features of the operational prediction space included in the RTS instances is small and 3) the range of one or more elements is narrow so that the risk of overtraining is significant.

A VTS is consistent with an RTS if the two following conditions are met
1) If $E_k \in S_R$ Then $E_k \in S_V$ and
2) $\forall I_R \in S_R \exists I_V \in S_V, I_R \subseteq I_V$ The first condition requires that all elements that exist in the RTS also appear in the VTS. The second condition requires that the values of $E_k$ for all k that appear in a particular instance in $S_R$ also appear in an instance in $S_V$.

3) A Hybrid Training Set (HTS), $\{S_H\}$ combines both a VTS and RTS. It contains all of the instances in $\{S_V\}$ and $\{S_V\}$ is consistent with $\{S_R\}$. The efficiency of a training set $\chi$ is the derivative of prediction accuracy P with respect to the number of instances $N_I$, $\chi = dP/dN_I$. An HTS is more efficient than an RTS if $\chi_H > \chi_R$.

Figure 3:
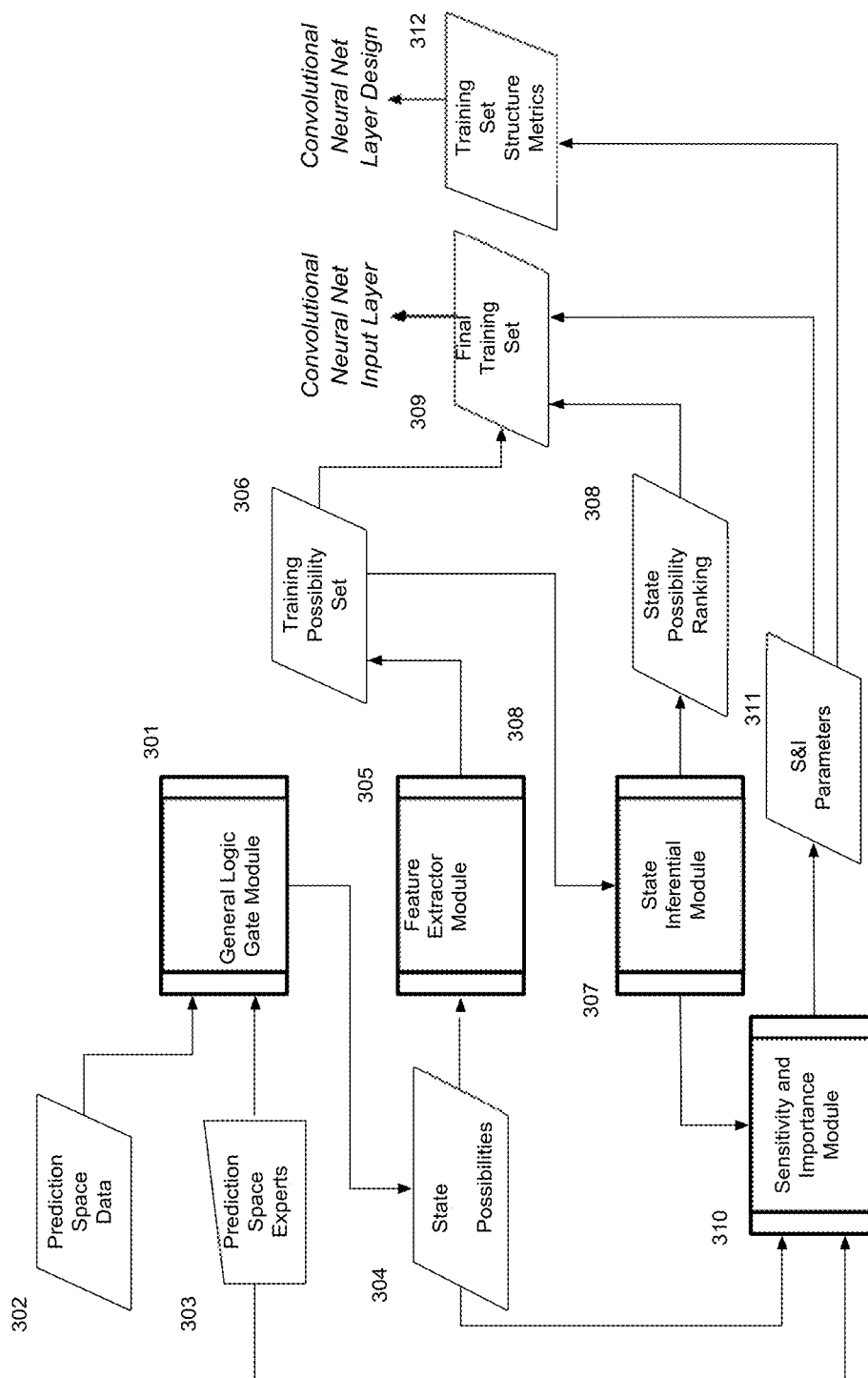
FIG. 3 illustrates a flow chart for generating Virtual Training Sets (VTS) according to one embodiment of the present invention.

FIG. 3 illustrates a sequence of steps implemented in one embodiment of the present invention. The method consists of generating a training set and training a NN with the training set. These steps may be used to generate a training set when there is no real-world training data available. The generated set in this case is referred to as a VTS.

A scenario-based approach is used to generate a set of alternatives. These alternatives provide the basis for the VTS. The set of alternatives is obtained from the solution of a Logic Gate Model (LGM) in the General Logic Gate Module (GLGM) 301. The logic gate model is in a form where it can simultaneously include both deductive and inductive sequences as needed. "General" refers to the fact that use of the Module is not restricted to a single kind of application in contrast to specific structures such as fault trees, event trees, decision trees, etc. The model is constructed using Prediction Space Data 302 and Prediction Space Experts 303. The Prediction Space Data 302 consists of knowledge about the Operational Space, O and the features of O that are factors in predicting either the current state of the system or a future state. In the latter case the Prediction Space Data 302 will also contain information about the processes that determine a state transition. Prediction Space Experts 303 are subject matter experts on O and are able to identify a candidate set of features necessary to identify possible locations for the current or future point in the operational space and to use expert judgment to describe the internal structure of these State Possibilities 304. The logic gate model is a compact representation of a complex logic equation. Solution of this equation yields the State Possibilities 304. Each State Possibility is unique and contains the operational space features and associated quantitative or qualitative values judged to be necessary to make a prediction of the current or future operational state with a convolution neural net. Predictive Space Expert Judgement 303 and Predictive Space Data 302 feed into GLGM 301 to produce State Possibilities 304.

Figure 4:
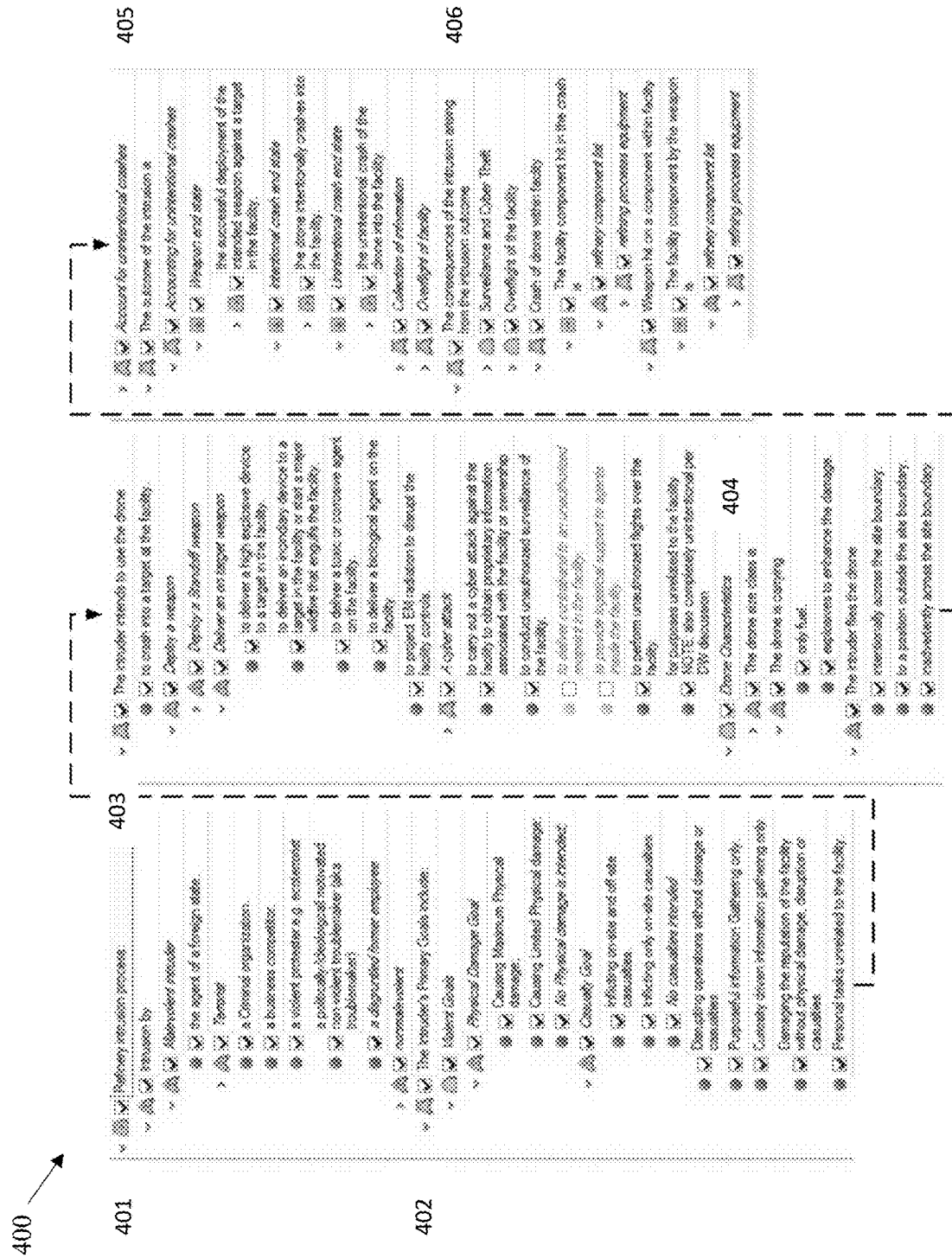
FIG. 4 illustrates a Logic Gate Model (LGM) to generate Drone Intrusion Scenarios according to one embodiment of the present invention.

An example of a Logic Gate Model (LGM) possibility model is shown in FIG. 4. This LGM represents possible attacks by a drone against a petrochemical facility. Its nominal function is to generate a VTS for a NN that assesses the likelihood of an intrusion and predicts the risk.

The LGM of FIG. 4 is constructed based using data on possible attacks by a drone against a petrochemical facility case for example, observed data on drone intrusions at facilities of other types, and data on drone capabilities 302 and the judgment of Prediction Space Experts, also known as Subject Matter Experts (SMEs), as to individual elements of the intrusion process 303. The SMEs and their areas of knowledge include:

Regional Director of Security for a multi-national oil and gas corporation
    Intruders, facility security and specific UAS concerns
Vice President of Engineering for a UAS manufacturer
    Capabilities of UAS and pilots with respect to specific scenarios
Expert on modeling explosions, fires and toxic chemicals at chemical and petroleum facilities.

Referring now to FIG. 4, the structure of the LGM follows the intrusion process as a hierarchical tree from Intruder Type 401, Intruder primary Goals 402, Intended Use of Drone 403, whether the Drone crosses the site boundary 404, the Outcome of the Intrusion 405 and the Consequences of the Intrusion 406. The gates in the model are of AND and OR form with several custom implementations. Much of the underlying structure is not visible as many of the gate sub models are unexpanded.

The visual representation of FIG. 4 is of a logic equation composed of the ordered, hierarchical logic gates. Solution of this equation yields the set of attack scenarios—the state possibilities to be considered when evaluating countermeasure systems. Each state possibility is a unique path through the LGM. Logic switching when producing the solution is used to ensure that the elements of a scenario are logically consistent. The GLGM-based approach makes it possible to consider a very large set of alternatives in a compact form and to incorporate new possibilities as they are discovered.

The model is the visual equivalent of the logic equation consisting of the ordered, hierarchical logic gates. Solution of this equation yields the set of attack scenarios—the state possibilities to be considered when evaluating countermeasure systems.

The scenarios are expressed in textual form as a series of sentences. Output variables are computed during the solution for each scenario. Because a scenario is simply an ordered path through the GLGM, the value of a metric at a particular element of the scenario can depend on one or more values of other computational variables at elements 'upstream'. This makes possible an efficient treatment of an arbitrary n-step Markov model. Both qualitative and quantitative variables are assigned to the nodes in the model. An ordered subset of output variables in a scenario constitutes the elements for each instance that will be input to the NN.

An example of an output scenario is the unedited text for one of the scenarios involving a terrorist attack from the solution of the LGM in FIG. 4 is as follows:

Refinery intrusion process: Intrusion by a Terrorist organization. The Intruder's Primary Goals include: Causing Maximum Physical damage; Inflicting on-site and off-site casualties. The intruder intends to use the drone to crash into a target at the facility. The drone size class is large. The drone is carrying explosives to enhance the damage. The intruder flies the drone intentionally across the site boundary. The outcome of the intrusion is the drone intentionally crashes into the facility. The selected target for the crash is catalytic cracker Given a successful hit on the target it suffers major damage. The consequences of the intrusion arising from the intrusion outcome Crash of drone within facility The facility component hit in the crash is distillation column |catalytic cracker| transport center Intentional crash Extensive physical damage to component Significant disruption of the facility operations; Extensive physical damage to component Significant repair costs Extensive physical damage to component Modest Extensive physical damage to component Limited environmental impact No or minimal compromise of Facility information; Limited Damage to the Facility Reputation. Intruder-specific data a Terrorist organization. Value of the consequences to the Intruder Repair costs Modest Operational Disruption Modest Casualties Significant Environmental Impact Modest Information loss Modest Reputation loss Significant Intruder's perception of potential deleterious impacts from the intrusion scenario (blowback) Very great Intruder's resource commitment Significant Intruder's perception of conditional interdiction likelihood Never Intruder's perception of interdiction consequences Catastrophic Difficulty in setting up the intrusion attempt for now a simple terminal for testing Significant Excess intruder risk terminal for testing Significant Counterintelligence effect on prevention likelihood Some Availability of comparable non-drone alternative scenarios Comparable alternatives Precedents set by similar scenarios Limited precedents Scenario-dependent Baseline prevention likelihood estimate.

Figure 5:
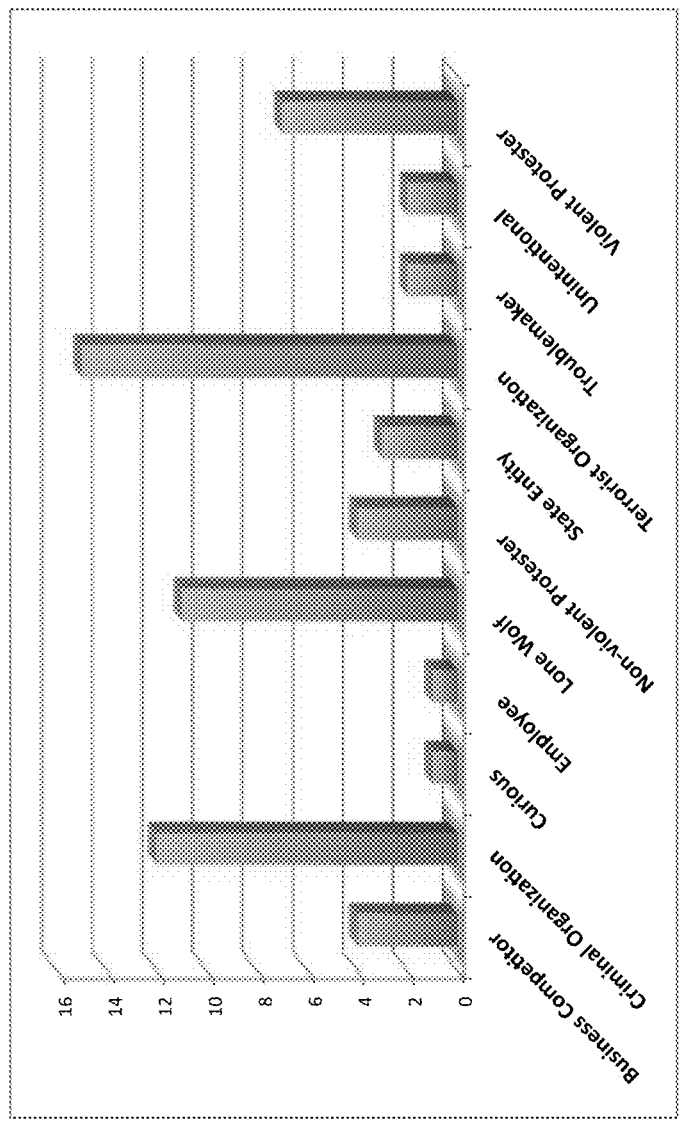
FIG. 5 illustrates a graph of number of scenarios by intruder type according to one embodiment of the present invention.
Figure 6:
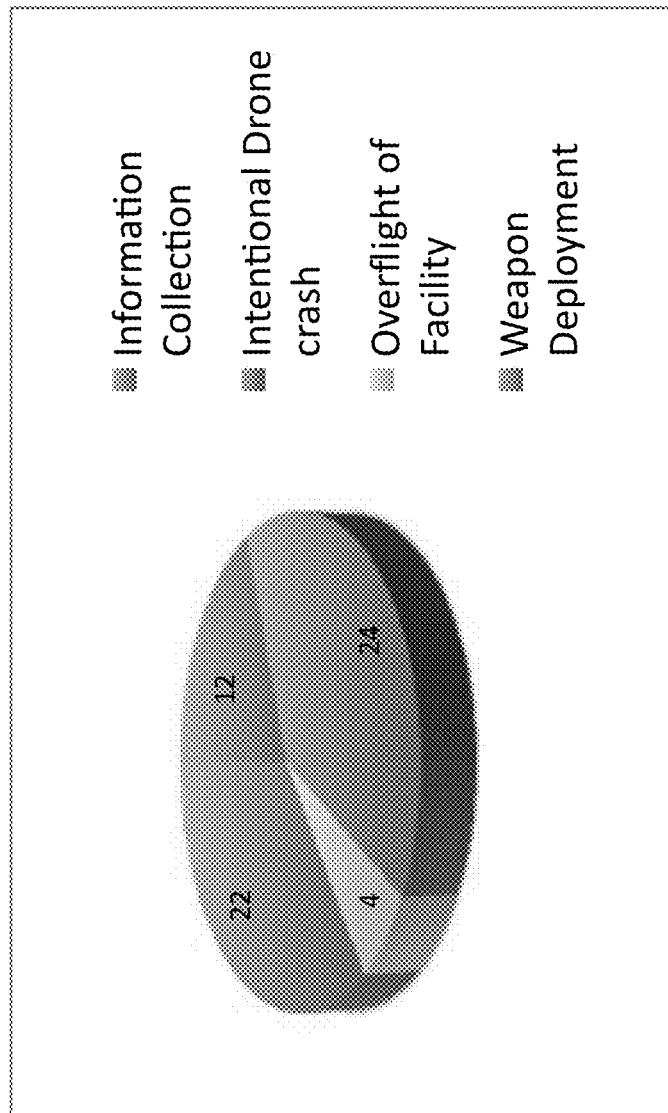
FIG. 6 is a pie chart of number of scenarios by intruder goal.
Figure 7:
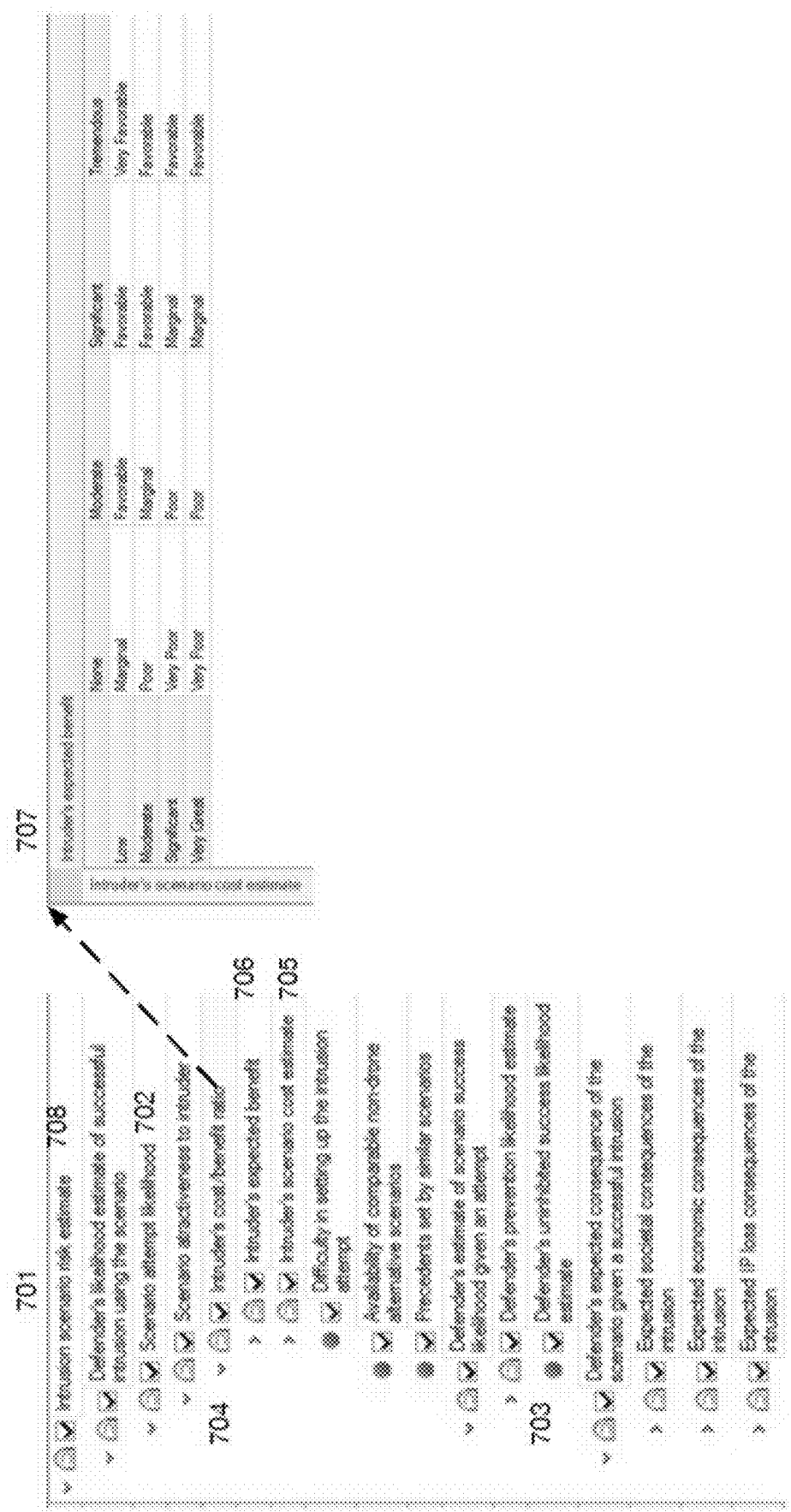
FIG. 7 illustrates step analysis of intrusion scenario risk estimate leading to intruder's expected benefit according to one embodiment of the present invention.

With reference to FIG. 4 and FIG. 7, the input data (closed circle), model nodal structure 400 and output scenarios and variable values FIG. 5 are stored in a common database. This enables one or more embodiments of the system and method to use database queries to group the results by one or more training set features. FIG. 5 shows the number of scenarios grouped by intruder type and in FIG. 6 by Intruder Goal. This capability makes it possible to subdivide the training set to evaluate performance of the NN in various regions of the operational space.

Referring now to FIG. 3, for each training set scenario, the State Inferential Module 307 is used to generate a decision metric value or a plurality of decision metrics to rank order the state possibilities 308 independent of the NN. Typically, the decision metric is a probability or more generally a likelihood—"the probability that property $\chi$ is $\chi_i$ for this training scenario is $p_i$=P" where for example P=0.2. The inputs to the State Inferential Module 307 are the Attributes (and Class/descriptors) embedded in each training scenario that are the inputs to the NN. The state possibility ranking 308 for each state possibility is the measure to be used for backpropagation as discussed below.

In general, an inferential module can have a structure similar to that shown in FIG. 7 for the UAS Intruder example above. The State Inferential Module 307 may be configured with one or more of the following algorithms including but not limited to Bayesian Belief Network, Multi attribute Weighting, Approximate Reasoning, etc. The State Inferential Module 307 used to evaluate the drone incursion scenarios 701 is a forward-chaining Approximate Reasoning model. Approximate reasoning is a particular implementation of predicate logic where a fuzzy set representation is employed to describe the value of a variable.

Referring now to FIG. 7, an example of this model is a risk/cost benefit analysis from the perspective of the intruder which is expressed in terms of a SCENARIO ATTEMPT LIKELIHOOD 702. Solid circle icons indicate the inputs to the model. These inputs come from the State Possibilities 304 or from the Training Possibility Set 306. The inputs are of two forms, quantitative or qualitative. Quantitative inputs are converted to memberships in fuzzy sets defined by a Universe of Discourse (UOD) with a process called Fuzzification. For example, the input node DEFENDERS UNINHIBITED SUCCESS LIKELIHOOD ESTIMATE 703 has a UOD of {Very Unlikely, Unlikely, Likely, Nearly Certain}. If the corresponding output from the State Possibilities is in the form of a probability, say p=0.1 then it is converted to a Degree of Membership (DOM) vector, m=[0,0.2,0.8,0] where the element order is the same as in the UOD.

Each of the AND type gates is an inferential step. For example, the node INTRUDER'S COST/BENEFIT RATIO 704 with UOD {None, Very Poor, Poor, Marginal, Favorable, Very Favorable} is inferred from previously inferred estimates of the INTRUDER'S SCENARIO COST ESTIMATE 705 with UOD {Low, Moderate, Significant, Very Great} and INTRUDER'S EXPECTED BENEFIT 706 with UOD {None, Moderate, Significant, Tremendous}. This inference is performed using a rule base 707 with the inputs and output expressed in terms of a DOM vector for the specified UODs. These inferences chain forward to the top node INTRUSION SCENARIO RISK ESTIMATE 708. The internal representation of this output is also a DOM vector. It is converted to a quantitative value using the converse of Fuzzification. The model is run for each of the scenarios and a rank ordering of the risk to the owner of the facility is obtained. The use of the combination of a GLGM and an Inferential Module is extremely flexible and results in an evaluation that is consistent, traceable and defensible. The inferential module emulates subject matter expert judgment so there is an implicit incorporation of higher order human reasoning in the evaluation of the individual instances.

The Sensitivity and Importance Module 310 evaluates the State Possibilities. Sensitivity addresses the question of uncertainty: how does the variance in an input variable affect the ranking metric? A sub module that implements the Monte Carlo simulation algorithm is used to assess uncertainty. Each of the characteristics in a Possibility State can be considered as a random variable defined by a probability density function. The probability density function has a specified functional form that is related to the range of the variable. The parameters of the density function are, for example, the mean and the variance. These parameters are for example either determined from sample data, estimated directly by the Prediction Space Experts or estimated using a Bayesian analysis from surrogate data. The simulation can be either a separate analysis step or additional instances can be inserted into the final training set 309. In the latter case, biasing techniques including Latin Hypercube sampling can be employed to avoid overtraining the NN. The ranges of the characteristics defined in this way describe the portion of the operational space in which the convolution neural net has been trained.

Importance analysis addresses the question: What input variables have the most effect on an output metric? Multiple measures including Fussell-Vesely Importance, Differential Importance and others may be computed directly from the state possibilities in the Importance submodule. In addition, where direct input from the Prediction Space Experts is appropriate, Analytical Hierarchy Procedure algorithm and other expert elicitation methods can be used. The Sensitivity and Importance Parameters 311 can be used to assess important features of the convolutional neural net behavior including: is the Prediction Accuracy Goal met throughout the portion of the Operational Space where training occurs?, is the output of the NN stable for edge cases near the boundary of the training space? and are specific features of the Training Possibility Set unimportant for accurate prediction? Depending upon the answers it may be necessary to obtain additional real training data to understand specific Features. Alternatively, the structure of the NN could be simplified by reducing the number of nodes in the input layer or managing the evolution of a sparse NN.

Figure 8:
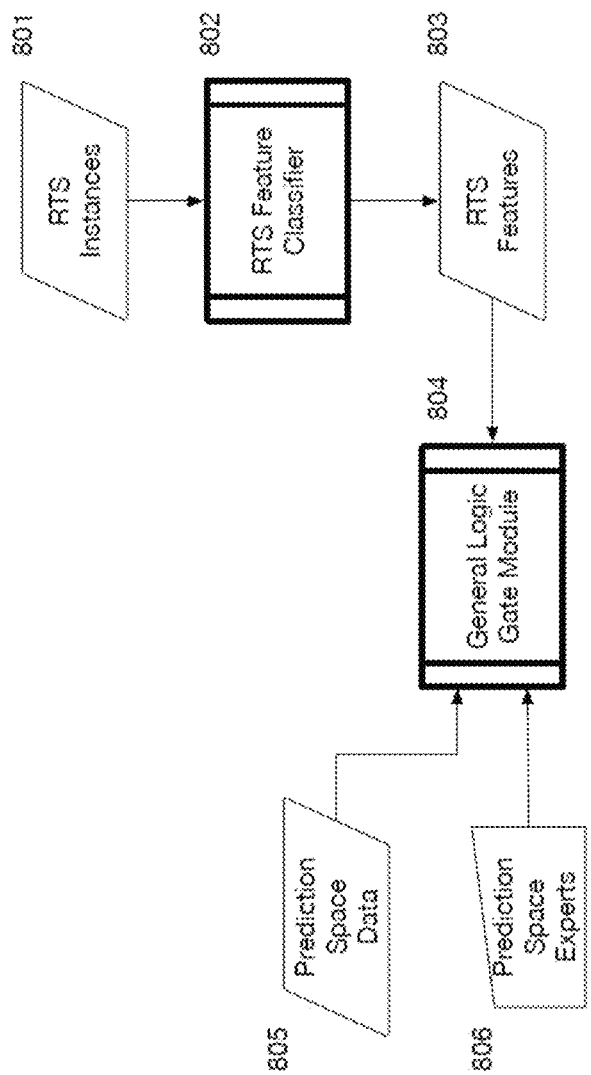
FIG. 8 illustrates HTS derived from Real world training sets (RTS) instances and Predictive Space Data and Predictive Space Expert judgement that inputs to the General State Logic Module according to one embodiment of the present invention.
Figure 9:
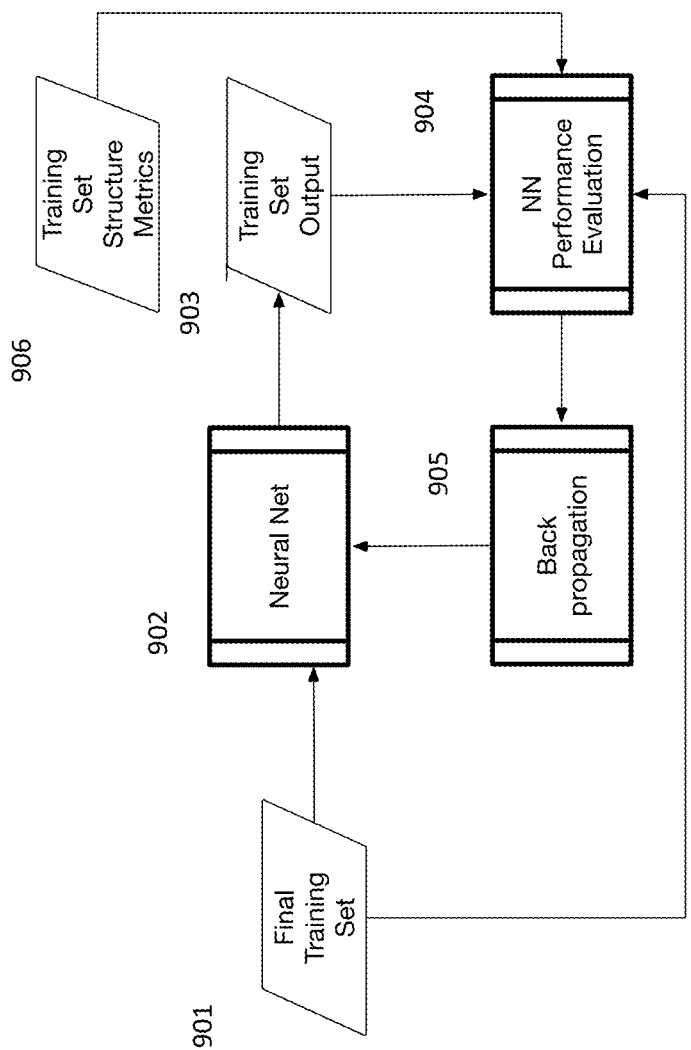
FIG. 9 illustrates a Block Diagram for using a Final Training Set generated with a method of one embodiment of the present invention for training of NN.

According to another embodiment of the present invention, if a set of real-world training data set (RTS) does exist, then the method of FIG. 3 is modified as shown in FIG. 8. A Feature Classifier module 802 extracts the features of the available training data RTS instances 801 for use in the GLGM 804 as shown. The choice of Classifier type is problem dependent. These identified features are then integrated into the GLGM 804. The feature classifier may be configured with one or more of the following algorithms Decision Trees, Clustering methods, vector machines and regression methods but not limited thereto as others are suitable. The GLGM is used to generate a set of scenarios that are then in the form of a Hybrid Training Set (HTS). A HTS is composed of the features in the original RTS and the much larger VTS. The granularity and extent of the HTS will be greater than that for the original sparse RTS. A simpler variation of this method could also be used to evaluate the quality/extent of the initial RTS. As noted, each instance in the training set has a unique identifier, an ordered set of elements that comprise the inputs to the convolutional NN input layer and an inferential evaluation variable value or values that represent the 'correct' result for that instance. The Final Training Set 901 as shown in FIG. 9 is the input to the convolutional NN during the training phase. There is no restriction on the software used to build and evolve the convolutional neural network. Therefore, the number of hidden layers, whether the layer connections are complete or sparse depends upon the characteristics of a particular application. The final training sets 901 generated with this method are design software agnostic. The training set structure metrics 906 computed output at the Sensitivity and Importance parameters of 311 are available to modify the network structure 902 and improve the backpropagation process 905.

Figure 10:
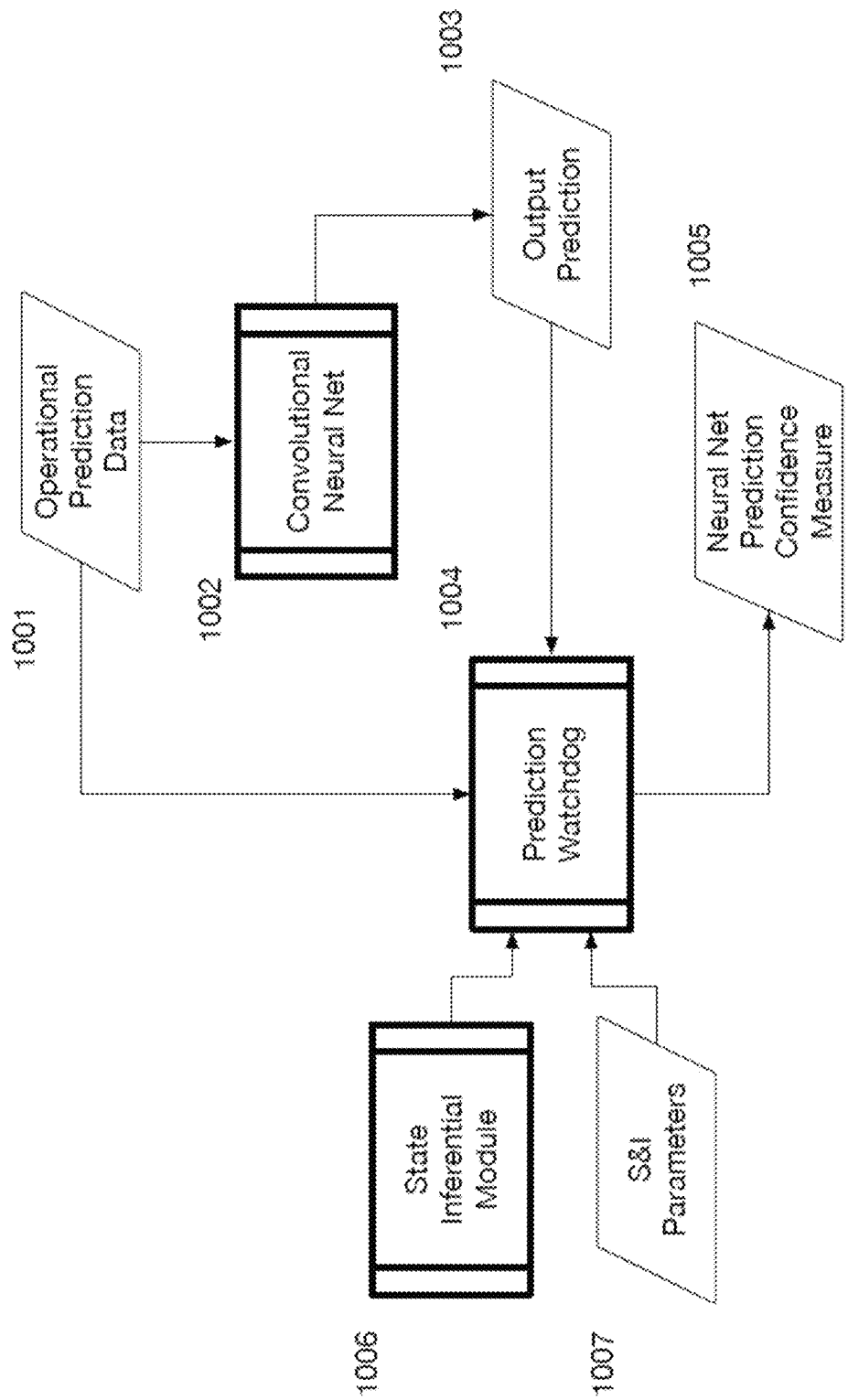
FIG. 10 illustrates an embodiment having a watchdog during operation of one or more embodiments of the present invention.
Figure 11:
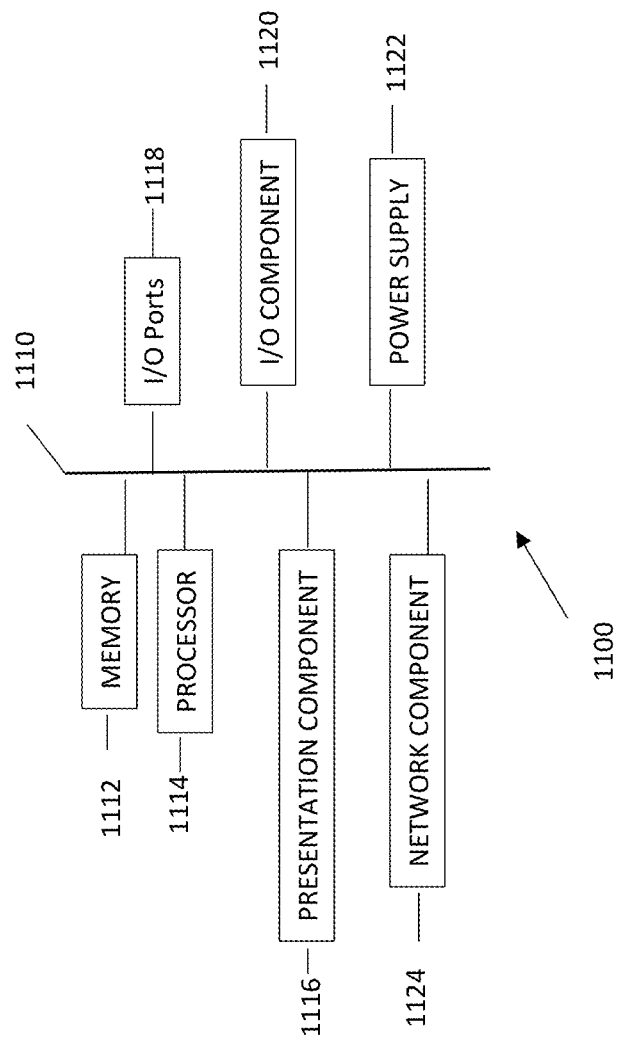
FIG. 11 illustrates a block diagram of an example computing device for implementing aspects disclosed herein an is designated generally a computing device.

During the operational mode an independent function is used to assess the NN predictions in real time as shown in FIG. 10. Operational Prediction Data 1001 is input to the trained convolutional neural net 1002 and the Output Prediction 1003 is generated. The Operational Prediction Data 1001 and the Output Prediction 1003 are input to the Prediction Watchdog 1004. The Predication Watchdog 1004 assesses the Output Prediction based on the training phase and generates a Neural Net Prediction Confidence Measure 1005. The Confidence Measure provides an independent check on the output from the neural net. The Watchdog is a modified version of the State Inferential Model 1006 used in generating the Final Training Set. The Sensitivity and Importance Parameter(s) 1007 determined during the training phase (see FIG. 3) provide additional information to weigh the Watchdog evaluation. The Watchdog is not intended as a replacement for the ANN itself as a well-trained net will be able to perform better than the original inferential model.

One aspect of an embodiment of the system and method is: the introduction of VTS's for applications where RTS data does not exist and: the creation of HTSs composed of a mixture of elements from a VTS and varying amounts of RTS data.

An example computing device 1100 for implementing aspects disclosed herein, is designated generally as a computing device. The computing device includes a bus 1110 that directly or indirectly couples the following devices: computer-storage memory 1112, one or more processors 1114, one or more presentation components 1116, input/output (I/O) ports 1118, I/O components 1120, a power supply 1122, and a network component 1124. The computer device should not be interpreted as having any dependency or requirement related to any single component or combination of components identified. The computer device may be described as either a seemingly single device, multiple computing devices may work together and share the described device resources. For instance, computer-storage memory may be distributed across multiple devices, processor(s) may provide located on different devices, and so on. The described computing device is but one example of a suitable computing environment and is not intended to suggest any limitation as to the scope of use or functionality of the invention. Neither should the computing device be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments, such where tasks are performed by remote-processing devices that are linked through a communications network. For instance, computer-storage memory may be distributed across multiple devices, processor(s) may provide housed on different devices, and so on.

Computer-storage memory may take the form of the computer-storage media and operatively provide storage of computer-readable instructions, data structures, program modules and other data for the computing device. For example, computer-storage memory may store an operating system, a universal application platform, or other program modules and program data. Computer-storage memory may be used to store and access instructions configured to carry out the various operations disclosed herein.

As mentioned below, computer-storage memory may include computer-storage media in the form of volatile and/or nonvolatile memory, removable or non-removable memory, data disks in virtual environments, or a combination thereof. And computer-storage memory may include any quantity of memory associated with or accessible by the display device. The memory may be internal to the display device, external to the display device, or both. Examples of memory include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device. Additionally. or alternatively, the computer-storage memory may be distributed across multiple display devices e.g., in a virtualized environment in which instruction processing is carried out on multiple devices. For the purposes of this disclosure, "computer storage media," "computer-storage memory," "memory," and "memory devices" are synonymous terms for the computer-storage media, and none of these terms include carrier waves or propagating signaling.

Processor(s) may include any quantity of processing units that read data from various entities, such as memory or I/O components. Specifically, processor(s) are programmed to execute computer-executable instructions for implementing aspects of the disclosure. The instructions may be performed by the processor, by multiple processors within the computing device, or by a processor external to the client computing device. In some examples, the processor(s) are programmed to execute instructions such as those illustrated in the flowcharts discussed below and depicted in the accompanying drawings. Moreover, in some examples, the processor(s) represent an implementation of analog techniques to perform the operations described herein. For example, the operations may be performed by an analog client computing device and/or a digital client computing device.

Presentation component(s) present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices, across a wired connection, or in other ways.

Ports allow computing device to be logically coupled to other devices including I/O components, some of which may be built in. Examples I/O components include, for example but without limitation, a microphone, joystick, game pad, satellite dish, scanner, printer, wireless device, etc.

The computing device may operate in a networked environment via a network component using logical connections to one or more remote computers. In some examples, the network component includes a network interface card and/or computer-executable instructions (e.g., a driver) for operating the network interface card. Communication between the computing device and other devices may occur using any protocol or mechanism over any wired or wireless connection. In some examples, the network component is operable to communicate data over public, private, or hybrid (public and private) using a transfer protocol, between devices wirelessly using short range communication technologies (e.g., near-field communication (NFC), BLUETOOTH branded communications, or the like), or a combination thereof.

In at least one embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

REFERENCES

T. F. Bott and S. W. Eisenhawer, "A Logic Model Approach to the Conceptual Design of a Scientific/Industrial Complex", ASME-PVP Annual Meeting, Vancouver, 2002, PVP-444, pp 119-127.

S. W. Eisenhawer, T. F. Bott and R. E. Smith, "An Approximate Reasoning-Based Method for Screening High-Level-Waste Tanks for Flammable Gas", Nuclear Technology, Vol. 130, 2000 June, pp 351-361.

What is claimed is:

1. A computer implemented method for generating a training set to train a neural network comprising the steps of:
   providing prediction space data to a General Logic Gate Module (GLGM);
   providing prediction space expert judgement to the GLGM;
   solving the GLGM to produce a set of state possibilities;
   providing the set of state possibilities to a feature extraction module;

applying to the set of state possibilities within the feature extraction module feature extraction to produce elements of a training possibility set;

providing the training possibility set to a state inferential module and to a final training set;

generating with the state inferential module a possibility ranking that is independent of the neural network;

providing a state possibility ranking to the final training set;

generating a neural network input layer from the final training set informed by one or more of the state possibility ranking, and the training possibility set; and generating a neural network layer design from the training set structure metric wherein the prediction space data is selected from one or more of i) a virtual prediction space data, ii) a real prediction space data, or iii) a combination of i) and ii) to produce hybrid prediction space data.

2. The method of claim 1 wherein the set of state possibilities produced include one or more of a Virtual Training Set (VTS) derived from the virtual prediction space data, a Real Training Set (RTS) derived from the real prediction space data and a Hybrid Training Set (HTS) derived from the hybrid prediction space data.

3. The method of claim 2 further comprising a backpropagation module to further train the neural network.

4. The method of claim 3 wherein the backpropagation module is linked to the method used to generate the HTS.

5. The method of claim 3 wherein the backpropagation module includes analysis with predicate logic.

6. The method of claim 2 wherein the HTS extends a range of the neural network in a consistent and traceable way beyond that of the neural network trained only with the RTS.

7. The method of claim 2 wherein the backpropagation module is linked to the method used to generate the VTS.

8. The method of claim 2 wherein the neural network trained with the VTS yields accurate predictions in an operational environment when the RTS is sparse or nonexistent.

9. The method of claim 1 further comprising a backpropagation module to further train the neural network.

10. The method of claim 9 wherein the backpropagation module includes analysis with predicate logic.

11. The method of claim 1 wherein the set of state possibilities produced during operation of the GLGM include intermediate quantitative values or qualitative values.

12. The method of claim 1 wherein the elements of the final training set go to the neural network input layer.

13. The method of claim 1 wherein the state inferential module analyzes the training possibility set using one of Bayesian Belief Network, Multi attribute Weighting, or Predicate Logic.

14. One or more computer storage devices having computer-executable instructions stored thereon for generating training sets to train a neural network, which, on execution by a computer, cause the computer to perform operations, the instructions comprising:

providing prediction space data to a General Logic Gate Module (GLGM);

providing prediction space expert judgement to the GLGM;

solving the GLGM to produce a set of state possibilities;

providing the set of state possibilities to a feature extraction module;

applying to the set of state possibilities within the feature extraction module feature extraction to produce elements of a training possibility set;

providing the training possibility set to a state inferential module and to a final training set;

generating with the state inferential module a possibility ranking that is independent of the neural network;

providing a state possibility ranking to the final training set;

generating a neural network input layer from the final training set informed by one or more of the state possibility ranking, and the training possibility set; and generating a neural network layer design from the training set structure metric wherein the prediction space data is selected from one or more of i) a virtual prediction space data, ii) a real prediction space data, or iii) a combination of i) and ii) to produce hybrid prediction space data.

15. The method of claim 14 wherein the set of state possibilities produced include one or more of a Virtual Training Set (VTS) derived from the virtual prediction space data, a Real Training Set (RTS) derived from the real prediction space data and a Hybrid Training Set (HTS) derived from the hybrid prediction space data.

16. The method of claim 15 wherein the HTS extends a range of the neural network in a consistent and traceable way beyond that of the neural network trained only with the RTS.

* * * * *